Nov. 14, 1944.   T. A. CAMPBELL   2,362,880
COUPLER
Filed Oct. 24, 1942
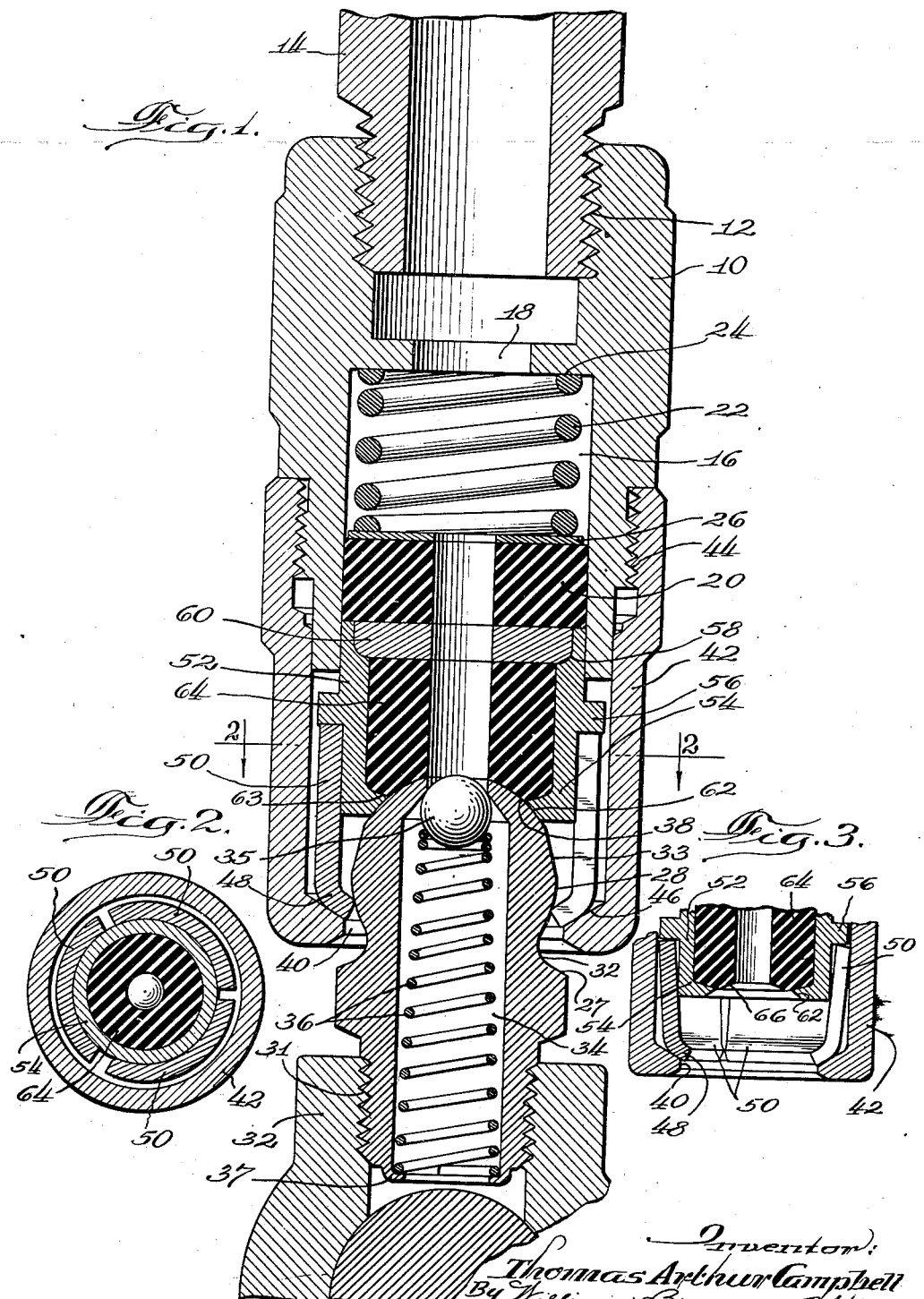
Inventor:
Thomas Arthur Campbell
By Williams, Bradbury & Hinkle
Attorneys Patented Nov. 14, 1944

2,362,880

UNITED STATES PATENT OFFICE 2,362,880

COUPLER

Thomas Arthur Campbell, Chicago, Ill., assignor to Stewart-Warner Corporation, Chicago, Ill., a corporation of Virginia Application October 24, 1942, Serial No. 463,158

1 Claim. (Cl. 285—169)

My invention relates to couplers and is more particularly concerned with quick-detachable couplers of the kind commonly used to connect the discharge conduit of a lubricant compressor with a fitting attached to the bearing of an automobile or other piece of machinery.

In the lubrication of tanks and other items of military equipment, there has arisen a demand for a lubricating system of the foregoing type which has all of the following characteristics. It must be capable of handling large volumes of oil or other light lubricant at low pressure without leakage between the coupler and fitting. The fitting must be readily accessible for inspection and cleaning of the sealing surface and the coupler must be capable of application and removal to the fitting when held either in direct axial alignment with the fitting or at a substantial angle to this axis. The coupler must be capable of being removed from the fitting by a direct pull and without the exertion of undue force, yet the coupler must grip the fitting sufficiently to prevent the coupler from separating from the fitting under the pull of gravity when the coupler is suspended from an overhead fitting. There must be mechanical means to limit angular movement between the coupler and fitting to prevent the coupler from moving to a position beyond the sealing range between the coupler and fitting. The construction of the coupler and fitting must be such that these parts are not hurt by dirt and will effect a lubricant-tight seal therebetween even though some dirt be present on the sealing surface of the fitting. The coupler and fitting must be so constructed that a lubricant-tight seal will be effected therebetween even though the sealing surface of the fitting has nicks or cuts therein. The fitting must be capable of being made of extremely hard material to withstand abuse.

None of the prior art lubricating systems embodies all of these characteristics and an object of my invention is to provide a new and improved lubricating system which does embody all of these characteristics.

Another object of my invention is to provide a new and improved coupler which is effective to form a fluid-tight seal under low fluid pressure and capable of preventing leakage of either high or low viscosity fluids between the coupler and fitting.

Another object of my invention is to provide a new and improved coupler having a wider range of use with different viscosities of fluids and under different pressure conditions than is afforded by the prior art couplers.

Another object of my invention is to provide a new and improved coupler which forms both a metallic and non-metallic contact with the fitting.

Another object of my invention is to provide a new and improved coupler which will form an absolutely lubricant-tight seal with a fitting when used with oil or semi-fluid lubricants under extremely low fluid pressure.

Another object of my invention is to provide a new and improved coupler which is capable of handling a greater lubricant flow than the couplers of the prior art lubricating systems.

Another object of my invention is to provide a new and improved coupler which will form an effective lubricant-tight seal with large volume fittings whose sealing surfaces have been nicked or otherwise impaired.

Another object of my invention is to provide a new and improved coupler having a wide range of angular movement but having mechanical means for preventing angular movement beyond the sealing range.

Another object of my invention is to provide a new and improved coupler which is capable of handling large volumes of fluid, affords a wide range of angular misalignment between the coupler and fitting, and forms an effective seal with the fitting despite the presence of dirt or nicks on the sealing surface of the fitting.

Another object of my invention is to provide a new and improved coupler which is particularly adapted for use with fittings of larger dimensions than those commonly employed on automobiles and similar machines and which offers less restriction to lubricant flow in large volume.

Another object of my invention is to provide a new and improved coupler utilizing sealing means of neoprene or like substance which is capable of standing up under high fluid pressures, is substantially unaffected by the presence of dirt on the fitting, and has a wide angularity of application to the fitting.

Another object of my invention is to provide a new and improved coupler which is particularly designed to utilize sealing members formed of neoprene or other synthetic rubbers or materials.

Another object of my invention is to provide a new and improved coupler which can be economically manufactured, which uses sealing members formed of materials which are resistant to lubricant, which is adapted for all extremes of temperature, and which will give long and trouble-free service.

Another object of my invention is to provide a new and improved coupler which can be readily dis-assembled and re-assembled for purposes of inspection, repair or replacement.

Other objects and advantages will become apparent as the description proceeds.

In the drawing:

Fig. 1 is a view showing a longitudinal section of my new and improved coupler and illustrating this coupler as being applied to a fitting attached to a bearing member;

Fig. 2 is a view showing a transverse section through the coupler of Fig. 1 and is taken on the line 2—2 of that figure; and Fig. 3 is a fragmentary view illustrating the position of the sealing member when the coupler is detached from the fitting.

The preferred embodiment of my new and improved coupler which is illustrated in the drawing comprises a tubular body 10 having a threaded inlet 12 adapted to be secured to the threaded end of a discharge tube 14 of a lubricant compressor or other means for supplying lubricant or other liquid or semi-liquid material under high or low pressure. The tubular body 10 provides a cylinder 16 which communicates with the inlet end of the body through a passage 18. A piston 20 of neoprene, cork, or a combination thereof, or of other similar material, is slidably mounted in the cylinder 16 and forms a lubricant-tight seal with the walls of this cylinder.

A coil spring 22 is confined between the piston 20 and an internal shoulder 24 provided by the body 10 and urges the piston 20 towards the lower or outlet end of the coupler body 10. A metal washer 26 is preferably placed between the piston 20 and the lower end of the spring 22 to prevent this spring from cutting into the upper surface of the piston.

The piston 20 acts upon a combined sealing and gripping means to form a lubricant-tight seal and an interlocking connection between the coupler and a fitting attached to the bearing part of a machine. Such a fitting is indicated at 27 and comprises a tubular body having a head 28, a neck 29, a hexagonal nut portion 30 and a tapered threaded end 31. The threaded end is adapted to be permanently attached to a bearing part, such as is indicated by the reference numeral 32 in Fig. 1. The head 28 is completely spherical except for an intermediate tapered portion 33 which facilitates separation of the coupler jaws during the application of the coupler to the fitting.

The lubricant passage 34 in the tubular fitting is normally closed at its normal or upper end by a ball valve 35 which is urged against the in-turned end of the fitting by a spring 36 resting on a flange 37 formed at the lower end of the fitting. It should be noted that the passage 36 adjacent the ball valve 35 has a materially greater diameter than this valve, so that a slight inward movement of the valve permits large volume flow of lubricant therepast without appreciable restriction to the in-flow of lubricant. The entire fitting is sturdily constructed and the tubular body of the fitting is preferably made of extremely hard material to permit the fitting to withstand a maximum of abuse without injury to the fitting or impairment of the spherical sealing surface 38 at the inlet end of the fitting.

When the coupler and fitting are engaged, as shown in Fig. 1, the sealing surface 38 of the fitting projects through the restricted opening 40 in the coupler sleeve 42. This sleeve has a threaded end 44 which is attached to the lower end of the coupler body 10 so that this body and the sleeve 42 form a unitary shell. The lower end of the sleeve is provided with a tapered annular camming surface 46, which co-acts with the inwardly bent lower ends 48 of the three gripping jaws 50 to cause these jaws to grip the head 28 of the nipple or fitting below the maximum diameter of this head.

The jaws 50 are urged into contact with the camming surface 46 by a housing 52 which is interposed between the piston 20 and the jaws 50. This housing 52 comprises a metal cup 54, having an outwardly projecting annular flange 56 which directly engages the upper ends of the three jaws 50. The upper end of the cup 54 is recessed, as indicated at 58, to receive a metal washer 60 which forms a support for the piston 20. The base of the cup 54 is provided with an opening 62 having an annular contact surface for engaging the head of the fitting and limiting outward movement of the housing 52 and piston 20 when the coupler is attached to a fitting. This annular contact surface is preferably curved to conform to the curvature of the head of the fitting. The bottom of the cup 54 slopes slightly toward opening 62, as indicated at 63.

A sealing member 64 of neoprene, or other similar material, is located in the housing 52 and has a curved, annular sealing surface 66 which engages and forms a lubricant-tight seal with the head of the fitting. When the coupler and fitting are disengaged, this annular sealing surface assumes the position shown in Fig. 3. Upon engagement of the coupler with a fitting, the material of the sealing member is compressed slightly as this sealing surface is engaged by the rounded head of the fitting. The mechanical compression of the sealing member which results from attaching the coupler to a fitting is relied upon to effect a lubricant-tight seal between the sealing member 64 and the head of the fitting. The piston 20, metal washers 26 and 60, and sealing member 64 have aligned openings therethrough which provide a passageway for the lubricant flowing through the coupler and into the passage 34 of the hollow fitting 24.

When my novel coupler is not attached to a fitting, the piston 20, housing 52, and jaws 50 move outwardly until the edges of the inwardly bent ends 48 of these jaws are forced into engagement with each other by the cam surface 48 and thus prevent further outward movement of these parts. When the coupler is applied to a fitting, the rounded head of the fitting pushes the jaws, housing, and piston 20 upwardly against the resistance of the spring 22 until the in-turned ends of the jaws can spread sufficiently to pass over the largest diameter of the fitting head. Thereafter the jaws, housing and piston move outwardly until the annular contact surface 62 engages the head of the fitting and the in-turned ends of the jaws are firmly clamped between the head of the fitting and the cam surface 46 to lock the coupler to the fitting.

While I have described the coupling operation as though the body and sleeve of the coupler remain stationary and the head of the fitting were forced into the end thereof, in ordinary practice the fitting is stationary and the coupler sleeve and body would move toward and from the fitting while the jaws, housing and piston of the coupler are held relatively stationary by the fitting.

After the coupler and fitting have been assembled, the spring 22 urges the housing 52 and sealing member 64 into contact with the head of the fitting. Most of the force of the spring 22 is resisted by the engagement of the contact surface 62 with the end of the fitting and the sealing member 64 is under only the slight mechanical compression resulting from the distortion of the lower end of this sealing member when the coupler and fitting are engaged. The housing 52 protects the sleeve member 64 against any additional longitudinal compression from the spring 22 or from the lubricant pressure acting on the piston 20.

The sealing member 64 is acted upon radially by the pressure of the lubricant in the central passage through this sealing member, but such radial force does not affect the sealing engagement between this sealing member and the fitting. This is an important feature of my invention, as the life of the neoprene sealing member and its effectiveness as a sealing means under all conditions of temperature and pressure are greatly increased where this sealing means functions independently of variations in lubricant pressure and is protected against the large forces generated in couplers where these couplers are used with high pressure lubricant compressors.

The piston 20 is always longitudinally compressed between the metal washers 26 and 60 by the force exerted by the spring 22 and this longitudinal compression of the piston 20 tends to increase the sealing effect between this piston and the walls of the cylinder 16. The upper end of this piston is also subjected to the lubricant pressure so that the longitudinal compression of the piston 20 varies with variations in lubricant pressure. The longitudinal compressive forces acting on the piston 20 are evenly distributed over the entire cross-section of this piston and no part of the piston is subjected to concentrated forces greater than the forces to which other parts of the piston are subjected.

When the coupler is disconnected from the fitting, the lower ends of the jaws 50 are spread apart and produce upward movements of the jaws, the housing, and the piston relative to the coupler shell. After the coupler has been completely removed from the fitting, the piston 20, housing 52 and jaws 50 are returned by spring 22 to their extreme lowermost position, as viewed in Fig. 1, and these parts remain in this position until the coupler is again applied to a fitting.

My new and improved coupler is particularly adapted for use in lubricating apparatus, since the neoprene of which the piston and sealing member are formed is not deteriorated by the lubricant and is, therefore, much more suitable for this purpose than is natural rubber. Where my novel coupler is intended to be used, or may be used, in extremely cold climates, the piston and sealing member are preferably formed of a special cold test neoprene. Since the sealing member is not affected by the force exerted by the piston 20, the size of the piston, the lubricant pressure acting thereon, and the total force exerted by this piston are not limited by the strength of the sealing member and my coupler is, therefore, particularly adapted for use with high lubricant pressures and with large fittings which require large couplers. Even in small couplers used with relatively low lubricant pressures, the life of the sealing member is materially lengthened by the protection afforded this sealing member by the housing 52.

The sturdy construction of the fitting and the hard material of which it is formed permit this fitting to withstand a maximum of abuse and in particular prevent the spherical sealing surface 38 from being seriously damaged when subjected to extremely rough use. Even if this sealing surface becomes slightly nicked or otherwise impaired, the neoprene sealing member is capable of making a lubricant-tight seal therewith. This neoprene sealing member is also capable of making a lubricant-tight seal with the sealing surface 38 of the fitting when particles of dirt or other similar material have not been completely removed from this surface. These characteristics of my invention are present, both when the coupler and fitting are in axial alignment and when these parts are misaligned to any extent made possible by the construction of the parts themselves. The maximum possible misalignment between the coupler and fitting occurs when the in-turned lower end of the coupler shell engages the hexagonal portion of the fitting and I preferably so construct the parts that this occurs before the sealing member of the coupler is moved out of sealing engagement with the spherical sealing surface 38 of the fitting so that a perfect seal exists between the coupler and fitting throughout the entire range of misalignment therebetween.

While I have described my invention as being particularly adapted for lubricating equipment, it is not limited to such use and may, with equal facility, be used to conduct gasoline or any other gaseous, liquid, or semi-solid material. The piston and sealing member may be made of natural rubber where my coupler is to be used with materials which do not deteriorate this rubber. A characteristic of my invention which materially increases its range of utility lies in the ability of my coupler to make a fluid-tight seal with a fitting under either extremely high or extremely low fluid pressures or any pressure therebetween and such fluid-tight seal is effective to prevent leakage of fluids of either high or low viscosity.

The operative parts of my novel coupler are enclosed within, and protected by, the coupler shell and are thus rendered immune to breakage or damage in ordinary use even though such use be of an extremely rough nature. These parts, as well as the fitting, may be made of sturdy construction and composed of the strongest and toughest available materials. Because the coupler can be applied to and removed from the fitting when either in direct alignment therewith or at a substantial axis to the angle of the fitting, my new and improved lubricating apparatus can be successfully applied to bearings in relatively remote and inaccessible locations, yet the sealing surface of the fitting is relatively accessible for cleaning or inspection.

While I have illustrated and described in detail only a single embodiment of my invention, it is to be understood that my invention is not limited to the details shown and described but may assume numerous other forms and is to be construed as including all variations and modifications falling within the scope of the appended claim.

I claim:

In a coupler of the class described, the combination of a tubular shell, a piston slidable in said shell and exposed to lubricant pressure, a spring for urging said piston in one direction, a deformable tubular sealing gasket movable with said piston, said sealing gasket adapted to be engaged by a head of lubricant receiving fitting to form a lubricant-tight seal therewith, a rigid housing enclosing said sealing gasket, said housing having an annular lower end engaging said gasket and limiting penetration of a fitting head into said housing, and gripping means for pulling a fitting head into said housing and against said lower end to effect sufficient distortion of said gasket to provide a seal.

THOMAS ARTHUR CAMPBELL.